(No Model.)
W. & A. CASTLE.
STERILIZER.
No. 581,148. Patented Apr. 20, 1897.
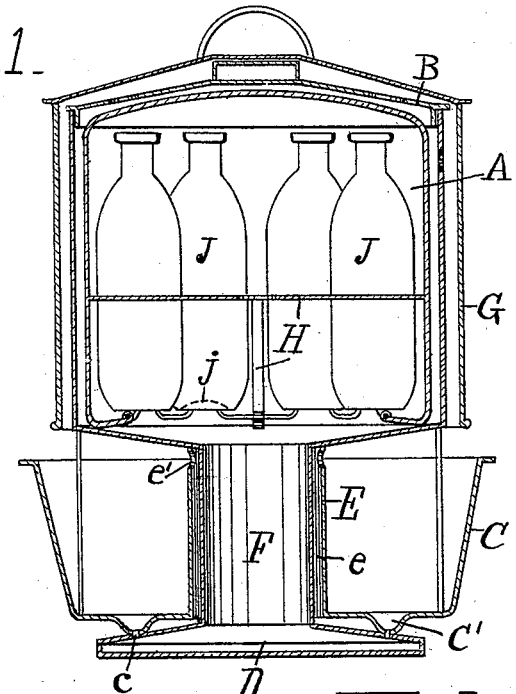
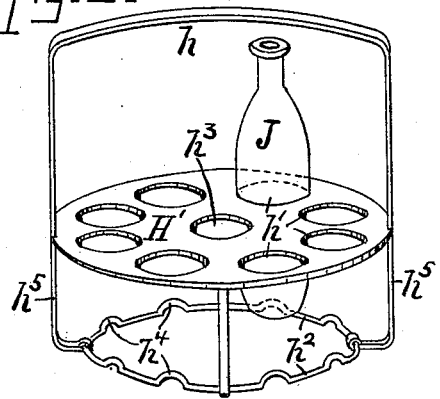
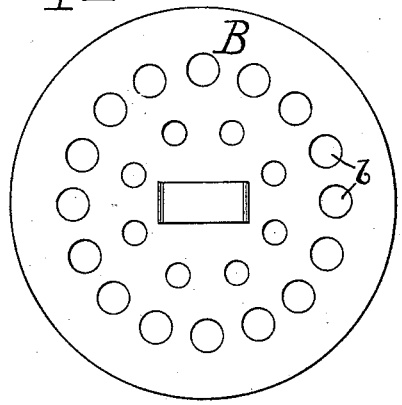
Witnesses.
A. R. Selden.
E. H. Marcellus.
Inventors.
Wilmot Castle
Arthur Castle
by
Howard L. Osgood
their Attorney.
THE NORRIS PETERS CO., PHOTO-LITHO., WASHINGTON, D. C.

UNITED STATES PATENT OFFICE.

WILMOT CASTLE AND ARTHUR CASTLE, OF ROCHESTER, NEW YORK.

STERILIZER.

SPECIFICATION forming part of Letters Patent No. 581,148, dated April 20, 1897.

Application filed December 31, 1896. Serial No. 617,684. (No model.)

*To all whom it may concern:*

Be it known that we, WILMOT CASTLE and ARTHUR CASTLE, citizens of the United States, and residents of the city of Rochester, county of Monroe, and State of New York, have invented certain new and useful Improvements in Sterilizers, of which the following is a specification, reference being had to the accompanying drawings, in which—

Figure 1 is a vertical section through one of our improved devices. Fig. 2 is a perspective view of the bottle-rack, and Fig. 3 is a top plan of the inner cover.

In the drawings, A is the steam-chamber or steamer, which has an open top.

B is the inner cover for said boiler, having a suitable number of perforations $b$ therethrough.

C is the supply-reservoir for containing water.

D is the heating-reservoir, the same being a thin vessel which is acted upon directly by the source of heat and receives its supply of water from the supply-reservoir C through small holes or passages $c$, formed in depressions $C'$ in the bottom of the reservoir C, which rest immediately upon the top of the heating-reservoir D. The heating-reservoir D communicates directly with the bottom of the steamer A by a central tube F. The water in the supply-reservoir C communicates through the passages $c$ with the heating-reservoir D and with the tube F, so that the level of the water in the supply-reservoir C is always the same as in the tube F. The water in the heating-reservoir D becomes rapidly heated and the steam therefrom rises through the tube F into the boiler A. As fast as the water is evaporated its place is supplied by water from the reservoir C. The reservoir C has a central tubular wall E, concentric with and surrounding the tube F, whereby an air-space $e$ is left between the wall E of the reservoir C and the tube F, and in order to secure free circulation of air through the air-passage $e$ and prevent the water in the reservoir C from boiling this passage is left open at the bottom and a series of holes $e'$ are cut through the wall E at its highest portion.

G is a hood or condenser which fits over the boiler A and its cover B and extends downward to about the upper edge of the supply-reservoir C. Steam rising through the passage F, the steamer A, and through the perforations in the cover B condenses against the walls of the hood and the water of condensation drips back into the reservoir C.

In the steamer A we insert a rack H, which is arranged to hold a series of bottles or other suitable containers for the milk or other fluid which is to be sterilized or pasteurized in the apparatus.

The bottles J are cylindrical in form with suitable necks, and in the bottom of each is a depression $j$. The rack H has a transverse plate H', which fits closely in the steamer A and which is provided with a series of perforations $h'$ adjacent to its edge. Each of these perforations is large enough to permit a bottle to rest therein. A bail $h$ is attached to the plate H' for lifting the rack. Underneath the plate H' is an annular skeleton ring $h^2$ in alinement with the row of bottle-holding perforations $h'$. This skeleton ring is preferably made of a ring of wire and has a series of projecting portions $h^4$ extending upward therefrom, each one of such projections being in line with an opening $h'$ in the plate H'. The projections $h^4$ are adapted to fit into the hollows in the bottoms of the bottles. In the center of the plate H' is an opening $h^3$, which is not intended for holding a bottle, but for permitting steam or currents of water to pass through the plate. Vertical rods $h^5$ connect the plate H' with the ring $h^2$. The plate H' is at such a height above the ring $h^2$ that the bottles when resting on their projections $h^4$ are encircled by the ring H' and about midway of their height. If now the bottles containing milk or other liquid to be treated are placed in their perforations $h'$ of the rack H and rest upon their projections $h^4$, the rack is ready for insertion into the boiler A. As before stated, the plate H' fits the boiler A quite closely. The projections $h^4$ lift the bottles above the bottom of the steamer, and the steam rising through the pipe F circulates freely around the lower part of the bottles and is confined to some extent underneath the plate H'. Hence the lower part of each bottle is heated to the temperature of the steam, provided the steam does not escape too freely above the plate. If the hood is upon the boiler and the perforated cover B is also thereon, an unvarying temperature of 212° Fahrenheit can be maintained in the sterilizer and the liquid in the bottles will be sterilized at this temperature. This process may be continued for a considerable length of time, inasmuch as the hood produces a condensation of almost all of the steam substantially as fast as it escapes and meets said hood, and the water of condensation runs back into the supply-reservoir C to be again made into steam.

In the opinion of many physicians the process of pasteurizing is deemed more valuable than that of the true sterilizing above mentioned. In pasteurizing milk the liquid should be maintained at a temperature of 160° to 170° Fahrenheit, whereby disease germs are destroyed and the chemistry of the milk is not so much changed as by sterilizing. With our device the pasteurizing is accomplished by performing the operation above described without the use of the hood. This permits the steam to pass quite freely out of the holes in the lid and immediately into the outer air and a lower temperature is maintained in the steamer A, while the use of the hood makes a kind of steam-jacket for the steamer A and a higher temperature (212° Fahrenheit) may be maintained for the purpose of sterilizing.

By the use of our rack an even temperature may be maintained throughout the fluid in each bottle which is treated. This is found to be the fact by careful test in the use of the apparatus above described and is supposed to be due to the thorough heating of that portion of each bottle which is below the plate and to the convection currents which are thus set up in the liquid.

What we claim is—

1. In a sterilizer, the combination of the supply-reservoir, the heating-reservoir, the steamer and the cover, of a rack adapted to fit removably in the steamer and to support a series of bottles for containing liquid to be treated, said rack consisting of a plate arranged about midway of the length of the bottles and provided with a row of bottle-holding openings, and an underlying skeleton ring in alinement with the row of openings in said plate, said ring having projections extending upwardly therefrom in line with each opening in said plate to form a step for the bottom of a bottle to rest upon.

2. In a sterilizer, the combination of the supply-reservoir, the heating-reservoir, the steamer and the cover, of a removable rack for holding bottles for containing liquid to be treated, said rack consisting of vertical rods, a plate secured to said rods and having bottle-holding openings therein and a skeleton ring secured to the rods underneath the plate and having projections extending upwardly in line with each of said openings in said plate to form a step for the bottom of a bottle to rest upon.

3. In a sterilizer, the combination of the supply-reservoir, the heating-reservoir, the steamer and the cover, a removable bottle-holding rack adapted to fit within the steamer and consisting of vertical rods, a handle, a plate secured to said rods and having a row of openings to receive the bottles and to support them about midway of their length and a skeleton ring below said plate secured to inward extensions of the rods so as to be in alinement with the row of openings in the plate, said ring having a projection extending upwardly in line with each opening in said plate and forming a step for the bottom of a bottle to rest upon.

4. In a sterilizer, the combination of a rack adapted to fit removably within a steamer and to support the bottles containing the liquid to be sterilized, said rack consisting of a plate having openings in which the bottles rest and an underlying skeleton ring having projections extending upwardly in line with the several openings in the plate and adapted to fit hollows in the bottoms of the bottles and vertical rods securing said plate and ring together, whereby the bottles are firmly held about midway of their length by the plate and supported on step-bearings of said ring at their lower ends, so as to steady said bottles against lateral movement without interference with the free circulation of steam about them.

WILMOT CASTLE.
ARTHUR CASTLE.

Witnesses:
H. L. OSGOOD,
E. H. MARSELLUS.